United States Patent [19]
Canal et al.

[11] Patent Number: 5,266,956
[45] Date of Patent: Nov. 30, 1993

[54] METHOD AND DEVICE FOR THE MEASUREMENT OF SHORT DISTANCES BY ANALYSIS OF THE DELAY IN THE PROPAGATION OF A WAVE

[75] Inventors: Yves Canal, Antony; Charles Barre, Epinay S/Orge, both of France

[73] Assignee: Thomson-CSF, Puteaux, France

[21] Appl. No.: 961,442

[22] Filed: Oct. 15, 1992

[30] Foreign Application Priority Data

Oct. 18, 1991 [FR] France .................. 91 12881

[51] Int. Cl.⁵ ............................................. G01S 13/08
[52] U.S. Cl. .................................. 342/128; 342/145
[58] Field of Search ....................... 342/122, 128, 145

[56] References Cited

U.S. PATENT DOCUMENTS 2,453,169 4/1943 Varian .
4,078,234 3/1978 Fishbein et al. .
4,591,865 5/1986 Canal .

FOREIGN PATENT DOCUMENTS 0251387 1/1988 European Pat. Off. .
0414567 2/1991 European Pat. Off. .

Primary Examiner—Mark Hellner
Attorney, Agent, or Firm—Meltzer, Lippe, Goldstein et al.

[57] ABSTRACT

The distance between the target and the measurement means is segmented into adjacent distance compartments, the first one of which starts at the zero distance. Each distance compartment has an associated energy level obtained by the demodulation of the delay measurement signal resulting from the product of correlation between the emitted signal and the received signal reflected by the target. The disclosed method consists in creating two distinct aliasings of the spectrum of the signal measurement signal, the energy level of which corresponds to the first distance compartment, these aliasings being achieved on the part of the spectrum corresponding to negative distances. This two distinct aliasings make it possible to obtain two distinct energy levels on the totality of the first distance compartment, and thus enable the measurement of all the distances on this first distance compartment, including the very small distances, even almost zero distances, by comparisons and analyses of the two energy levels.

Application: to the measurement of short distances for the detection of short-distance targets.

6 Claims, 6 Drawing Sheets

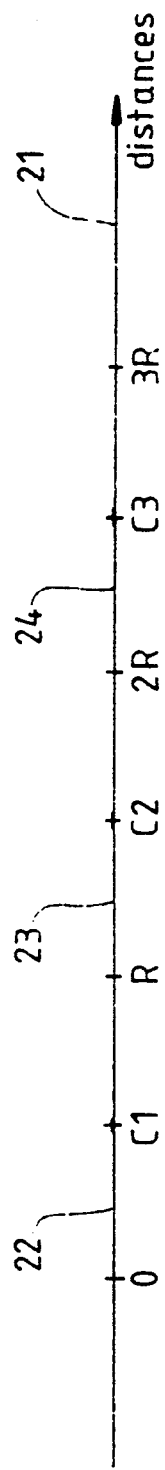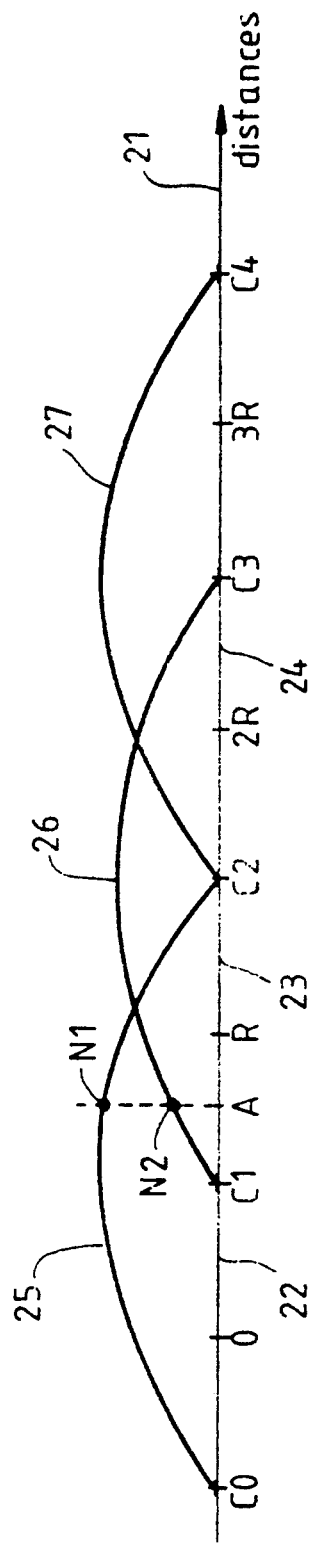

METHOD AND DEVICE FOR THE MEASUREMENT OF SHORT DISTANCES BY ANALYSIS OF THE DELAY IN THE PROPAGATION OF A WAVE

BACKGROUND OF THE INVENTION

The present invention relates to a method and device for the measurement of short distances by the analysis of the delay in the propagation of a wave.

It can be applied notably to anti-collision devices for vehicles, to distance-measuring instruments used for ships drawing alongside, or to any equipment that necessitates the detection, at a few meters, of the presence of a target for example. More generally, it can be applied to any instrument that carries out a measurement of the distance between itself and an obstacle that it is approaching, the range of the distances involved extending from zero to several tens of meters for example.

At present, instruments carrying out a distance measurement at less than some tens of meters are based either on a system of optical triangulation or on an analysis of the variation in the amplitude of the signal reflected by the obstacle. These methods are well known to those skilled in the art. However, measurement by optical triangulation is not compatible with unfavorable meteorological conditions such as rain or fog for example. This method therefore heavily penalizes applications for the measurement of short distances wherein any operation with uncertain results is unacceptable. The measurement by analysis of the variation in amplitude of the signal reflected by the obstacle relies on the attenuation of this signal relative to that emitted by the measuring instrument. When the obstacle is like a large-sized plane for example, the relative attenuation varies as the square of the distance to be measured while, in the case of a localized obstacle, the attenuation varies as the power of 4 of this distance. This method, based on electromagnetic emission, can work irrespectively of the meteorological environment However, it entails the assumption that the reflectivity of the obstacle does not vary when the measuring instrument approaches the obstacle. This is rarely the case in practical uses. Thus, for example, the vulnerability of this method can be seen in the case of an anti-collision device for vehicles where the reflectivity of these vehicles, for the majority of waves including electromagnetic waves, varies according to the angle at which they are seen, this being an angle that is notably variable when a trajectory is being changed. There also exist systems that measure the delay of acoustic propagation on the journey to and from the obstacle, but these systems rely on the knowledge of the velocity of sound: they are therefore dependent on the working altitude and are incompatible with spatial applications. Finally, they can easily be jammed, either unintentionally by the environment or deliberately by means of amplifiers with defined delays for example, and are therefore practically not used. The best known methods used to overcome the effects of the reflectivity of the target are the already-mentioned method of optical triangulation, or the measurement of the delay of propagation of a wave. In order to withstand meteorological conditions in particular, the measurement of the delay of an electromagnetic wave is presently the approach that is universally adopted when the distances to be measured exceed several tens of meters. This solution also makes it possible to overcome the constraints related to the speed of approach and therefore ensures a certain independence between distance and speed. The electromagnetic devices used in these methods furthermore perform very precise measurements of distance. However, the smaller the distance to be measured, the more complex and costly are the measuring devices. Indeed, these instruments all use a parameter known as distance resolution. This parameter determines a segmentation of the distance into adjacent compartments. A precise measurement of the distance consists then in comparing the energy level of the signal received from the target in two adjacent compartments to determine the real distance to the target by weighting the distances to the centers of these two compartments. For measurements of short distances, this method would necessitate a considerable raising of the frequency band of the emitted signal.

For example, to measure a distance of 1.5 meters, the distance resolution should be typically one meter and should in no case be more than 1.5 meters. The electromagnetic wave should then have a spectral width equal to 1.5 MHz and a pulse duration of 6.6 nanoseconds. This complicates the implementation of the measuring devices which become costly and unreliable.

SUMMARY OF THE INVENTION

The aim of the invention is to overcome the above-mentioned drawbacks by the fact that it enables the measurement of a distance smaller than the value of the distance resolution.

To this end, an object of the invention is a method for the measurement of short distances by analysis of the delay of propagation of a wave, the wave being frequency modulated and sent towards a target by a measuring means, the distance between the measuring means and the target being segmented into adjacent distance compartments, the first one of which starts at the position of the measuring means, at zero distance, each distance compartment having an associated energy level obtained by the demodulation of the delay measurement signal resulting from the product of correlation between the signal emitted and the signal received by the measuring means, the received signal being the reflection of the signal sent to the target, wherein said method consists in creating two distinct aliasings of the spectrum of the signal resulting from the product of correlation between the emitted signal and the received signal, and the energy level of which corresponds to the first distance compartment, these aliasings being done on the part of the spectrum that corresponds to negative distances, the alias corresponding to the zero distance, these two distinct aliasings making it possible to obtain two distinct energy levels on the totality of the first distance compartment and enabling the measurement of all the distances on this first distance compartment by comparisons and analyses of the two energy levels.

An object of the invention is also a device for the implementation of the above-mentioned method.

The main advantage of the invention is that it enables reliable and low-cost measurements of short distances, independently of the environmental conditions or the conditions of reflectivity of the targets.

BRIEF DESCRIPTION OF THE DRAWINGS

Other features and advantages of the invention shall appear from the following description and from the appended drawings, of which:

FIG. 2a shows an axis segmented into distance compartments;

FIG. 2b shows energy levels related to the distance compartments;

DESCRIPTION OF THE INVENTION

Figure 1A:
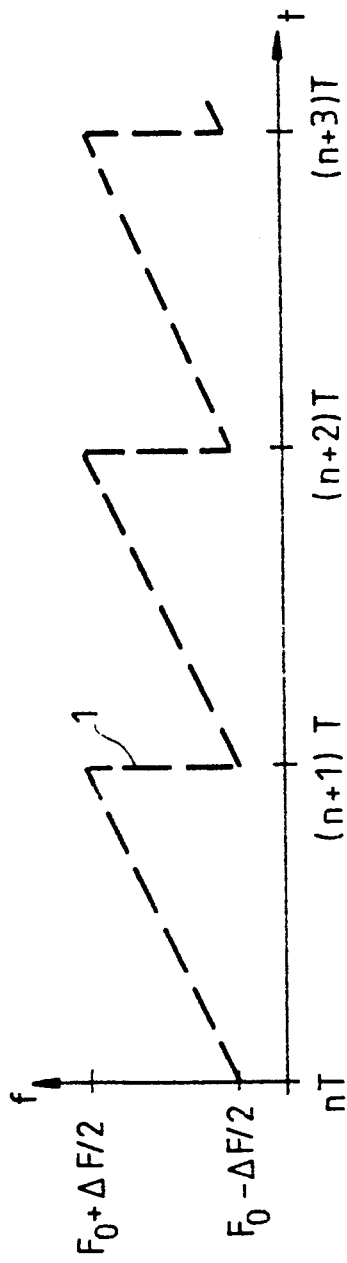
FIG. 1a shows a frequency modulation of the signal emitted by the measurement means.

FIG. 1a shows the frequency modulation of the emitted signal 1 by the distance measuring means, as a function of time. This signal is modulated at the frequency 1/T. According to the invention, this frequency modulation may be any frequency modulation. However, for ease of representation, the signal of FIG. 1a is modulated linearly as a function of time. In FIG. 1a, the frequency of the emitted signal varies between the frequency $F0-\Delta F/2$ and the frequency $F0+\Delta F/2$; in the figure, several modulation periods are represented between the instants $nT$, $(n+1)T$, $(n+2)T$ and $(n+3)T$, T representing the modulation period.

Figure 1B:
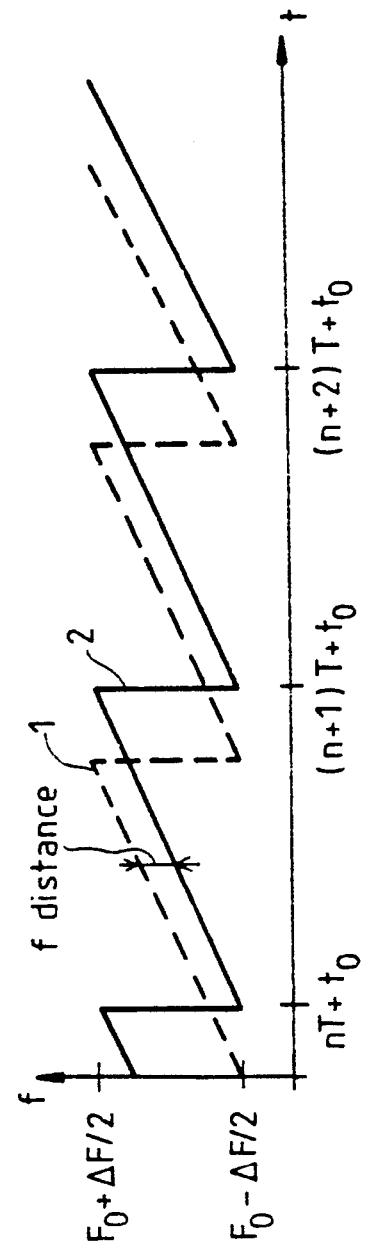
FIG. 1b shows the frequencies, as a function of time, of signals emitted and received by the measuring means.

FIG. 1b again shows the frequency of the emitted signal 1 as a function of time but also the frequency of the signal 2, received by the measuring means, as a function of time. This received signal comes from the reflection of the signal sent to the target, the distance of which has to be measured. The frequency of the received signal 2 again varies between $F0-\Delta F/2$ and $F0+\Delta F/2$ but the modulation is delayed by a period of time t0 with respect to the modulation of the emitted signal 1, and $$t0 = 2D/C \quad (1)$$

where D is the distance to be measured, between the target and the measuring means, and c is the velocity of light. In FIG. 1b, between the periods nT and t0 and (n+1)T, the difference in frequency between the emitted and received signals is constant; this distance is referenced f distance; it depends on the distance to the target. According to the notations defined here above:

$$f \text{ distance} = \Delta F \times t0/T$$

and according to the relationship (1)

$$f \text{ distance} = \frac{\Delta F}{T} \times \frac{2D}{C} \quad (2)$$

Thus $\Delta F$, T and c being known and f distance having been measured, it is possible to determine the distance D. However, this relationship does not enable precise measurements for, it is not possible to make fine measurements of the variations of the frequency f distance which correspond to variations of short distances for example, of the order of some meters for example, unless very costly devices of little reliability are used. For precise measurements, it is preferable to use a signal analysis method described hereinafter.

Figure 1C:
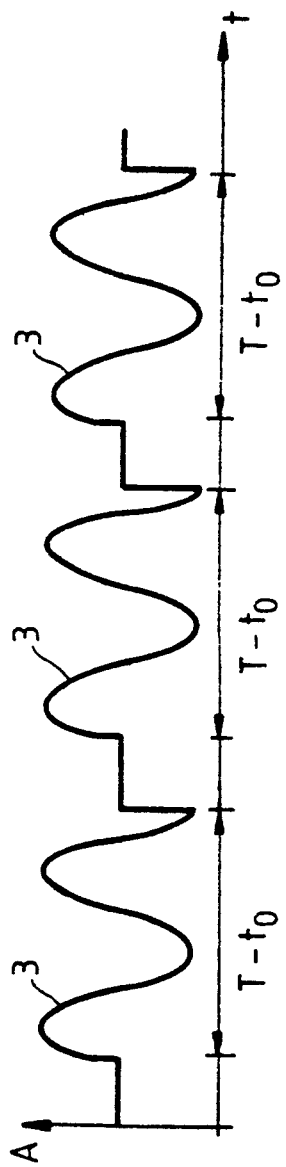
FIG. 1c shows the delay measurement signal resulting from the product of correlation between the emitted signal and the received signal shown in FIG. 1b.

FIG. 1c shows the amplitude A, as a function of time, of the product of correlation between the received signal and the emitted signal for a given distance. This resulting signal 3 depends on the delay and is therefore called a signal for the measurement of the delay. It is constituted by a succession of truncated sinusoid portions with a duration T-t0 and frequency f distance. Each sinusoid portion corresponds to a period of modulation of the emitted signal, minus the delay t0.

Figure 1D:
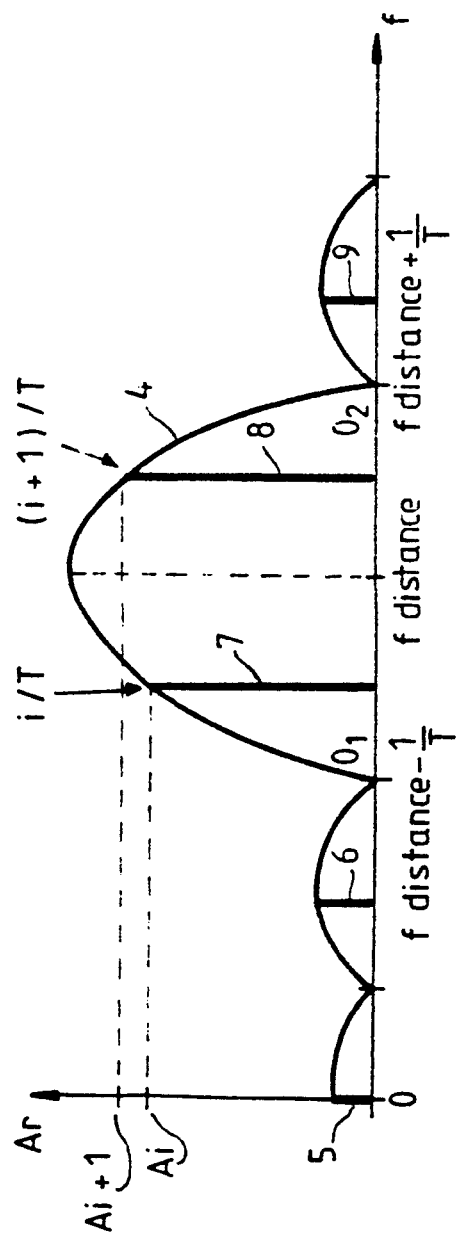
FIG. 1d shows the spectrum of lines of the signal of FIG. 1c.

FIG. 1d shows the spectrum of lines of the signal 3 of FIG. 1c. Indeed each sinusoid portion of the signal 3 has a spectrum, the lines of which vary according to the function sin x/x, this spectrum being centered on the frequency f distance. The width from the zeros 01, 02, having respective abscissa values f distance $-1/T$ and f distance $+1/T$, from the major lobe is equal to 2/T, T being again the above-defined modulation period. The delay term t0 is not taken into account, for it is negligible in value before T, typically of the order of 0.1% for example. This term t0 therefore does not come into play in the width of the lobes.

The position of the envelope 4 of the spectrum in the frequency domain depends of the value of the frequency f distance and hence on the distance; through it go the lines 5, 6, 7, 8 and 9 produced by the modulation of the emitted signal 1 at the frequency 1/T. These lines, unlike the envelope 4, remain fixed when the frequency f distance varies and are positioned at frequencies equal to an integer i times the modulation frequency 1/T, i being a positive integer. The successive lines 7 and 8 are for example located respectively at the frequencies i/T and (i+1)/T with amplitudes of Ai and Ai+1 as indicated in FIG. 1d. The delay measurement signal 3 of FIG. 1c, demodulated by frequencies that are multiples of 1/T, produces DC voltages related to the distance. These voltages represent a level of energy received by the measuring means. The frequency sweep of the emitted signal $\Delta F$ or its temporal dual $1/2\Delta F$ actually defines the distance resolution of the measurement. Indeed, the frequency resolution is the frequency for which f distance = 1/T. Now, according to the relationship (2), this means that:

$$\frac{1}{T} = \frac{\Delta F}{T} 2 \frac{DR}{c} \quad (3)$$

where DR is the resolution in distance, according to (3) we get:

$$DR = \frac{c}{2\Delta F}$$

Thus, since the measuring means send continuous wave trains modulated according to $\frac{1}{2}\Delta F$ towards the target, it is not possible to make an a priori definition of the distance, at best to within c/2ΔF, where c is the velocity of light. The distance may therefore be segmented into consecutive segments, each having the width R=c/2ΔF. These segments are called distance compartments.

FIG. 2a shows a distance measurement axis 21 comprising three adjacent distance compartments 22, 23 and 24 with a length R from the starting point O corresponding to the zero distance, the compartment 22 being between the points O and R, the compartment 23 between R and 2R and the compartment 24 between 2R and 3R. They respectively possess the centers C1, C2 and C3. Without any precise method of measurement, any distance between the points O and 3R belongs only to one of the three measurements corresponding to the position of these three central points C1, C2, C3 of the distance compartments 22, 23, 24.

Figure 3A:
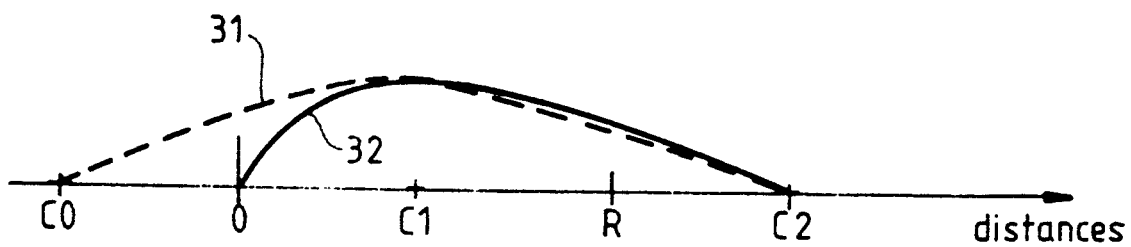
FIG. 3a shows an energy level curve resulting from the subtractive aliasing of the spectrum of the delay measuring signal.
Figure 3B:
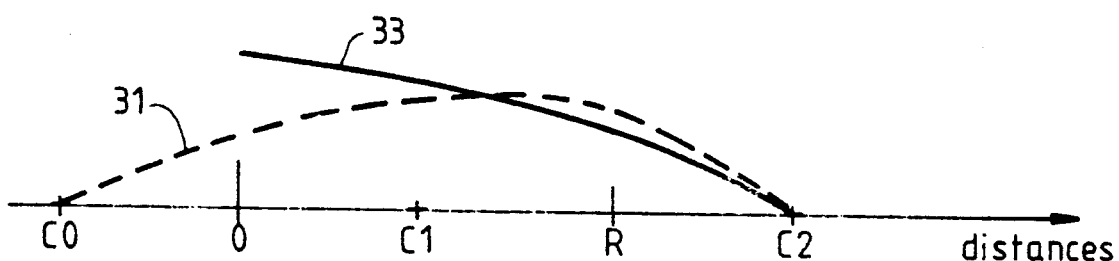
FIG. 3b shows an energy level curve resulting from the additive aliasing of the spectrum of the delay measuring signal.
Figure 3C:
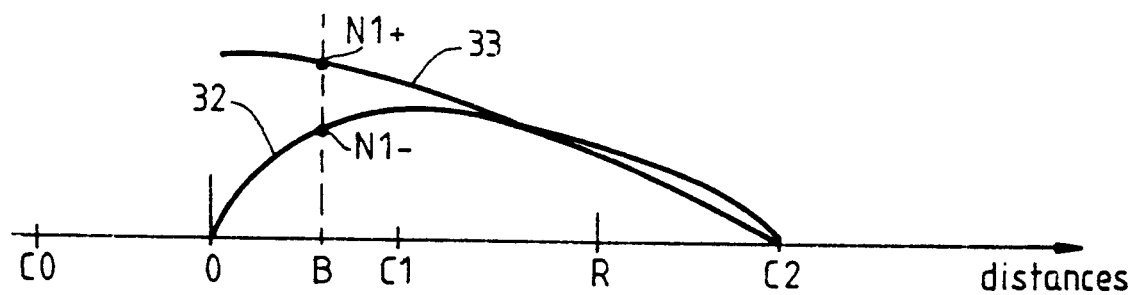
FIG. 3c shows two energy levels related to the first distance compartment and enabling measurements of short distances to be made.
Figure 4A:
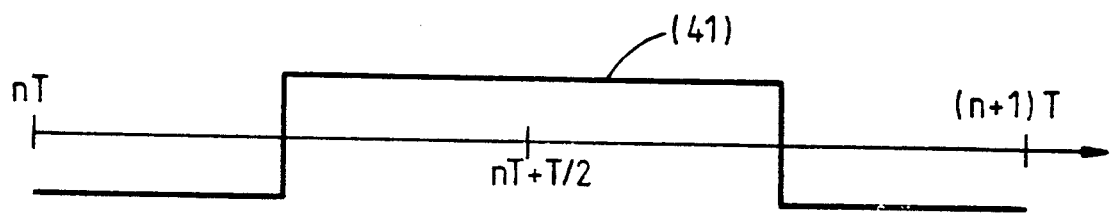
FIGS. 4a and 4b show two functions of demodulation of the delay measurement signal.
Figure 4B:
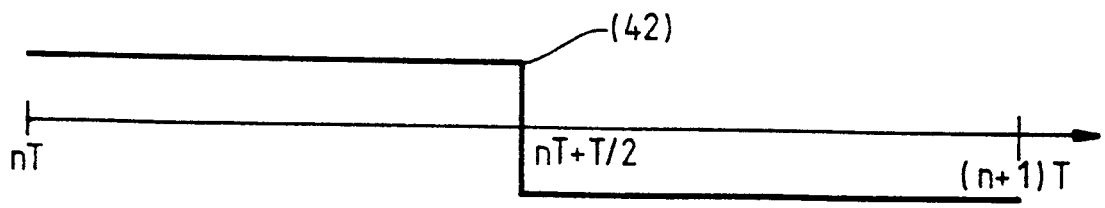

FIG. 2b shows the energy levels received by the measuring means, related to these distance compartments and obtained as described here above, by demodulation of the signal 3. The curves 25, 26 and 27 correspond respectively to the energy levels corresponding respectively to the distance compartments 22, 23, 24. Each energy curve is centered on the central point of its corresponding distance compartment and has a width equal to 2R, corresponding to the width 1/ΔF of the major lobe of the spectral envelope of FIG. 1d. The influence of the minor lobes is overlooked for they come into play to a very small extent. Thus, the energy related to the first distance compartment 22 is included between the point C0 having the abscissa value −R/2 and the previously defined point C2, the energy related to the second distance compartment 23 between the point C1 and the point C3, and the energy related to the third distance compartment 24 between the point C2 and the point C4 having the abscissa value 7R/2. It is then possible to use these energy levels to make precise measurements of the distances, i.e. measurements with a precision of less than the resolution distance of the distance compartments. For example, to make a precise measurement of a distance to a target at the point A located between C1 and R, it is enough to compare energy levels N1 and N2 of the two adjacent distance compartments 22 and 23 at this point, since there is a priori knowledge of the shape of the curves 25 and 26, and to compare the energy levels of the central points C1, C2, C3. When C1 has the highest energy level, it will mean that the point A is in the first distance compartment. The major drawback of this known method is that it does not enable the performing of measurements between the points O and C1, i.e. measurements included between 0 and R/2, hence the measurement of short distances since, between 0 and R/2, there is only one energy level curve. Any method of discrimination such as the one mentioned here above is then impossible to implement. In order to carry out measurements between 0 and R/2, the method according to the invention exploits the particular aspects of the first distance compartment 22. Indeed, the energy of this compartment extends to the negative distances, between 0 and C0 having the abscissa value −R/2. Distances such as these do not exist in reality and the corresponding part of the spectrum is actually aliased naturally so as to be superimposed on the part of the spectrum corresponding to the positive part of this first compartment. However, this aliasing is not controlled, and it is done according to any phase. The method according to the invention creates two distinct and defined aliasings in the vicinity of the starting point, in order to extend the above-mentioned distance measuring method to the distances ranging from 0 to R/2. These two aliasings are aliasings of the part of the spectrum corresponding to the negative distances, the position of the aliasing of the spectrum corresponding for its part to the negative distance illustrated by the point 0 of FIG. 2b. For example, a subtractive aliasing of the spectrum may be done as can be seen from the result obtained on the first distance compartment illustrated by FIG. 3a. The dashed curve 31 represents the theoretical energy as indicated in FIG. 2b, and the curve 32 represents the energy obtained following the subtractive aliasing of the corresponding spectrum. This aliasing may be obtained by a demodulation of the delay measurement signal 3 by multiplying this signal by a periodic function having a frequency 1/T such that this demodulation function has a 90° or 270° phase in the middle of the modulation period T like the signal 41 of FIG. 4a for example. An additive aliasing can thus be achieved as can be seen in FIG. 3b. This figure again shows the theoretical curve 31. The curve 33 shows the energy obtained following the additive aliasing of the spectrum. This aliasing can be obtained by a demodulation of the signal 3 by multiplying it by a periodic function at the frequency 1/T and phase-shifted by 90° to 270° with respect to the previous one like the signal 42 of FIG. 4b for example, namely that this function of demodulation shows a phase of 0° to 180° in the middle of the demodulation period T. As can be seen in FIG. 3c, two energy level curves are then available throughout the first distance compartment and enable measurements between starting point and the point C1 at a distance R/2. These measurements are furthermore precise because of the marked difference between the two curves 32 and 33 on this portion. Thus, to obtain the distance from the point B, it is enough to compare the energy levels N1+ and N1−.

Figure 5:
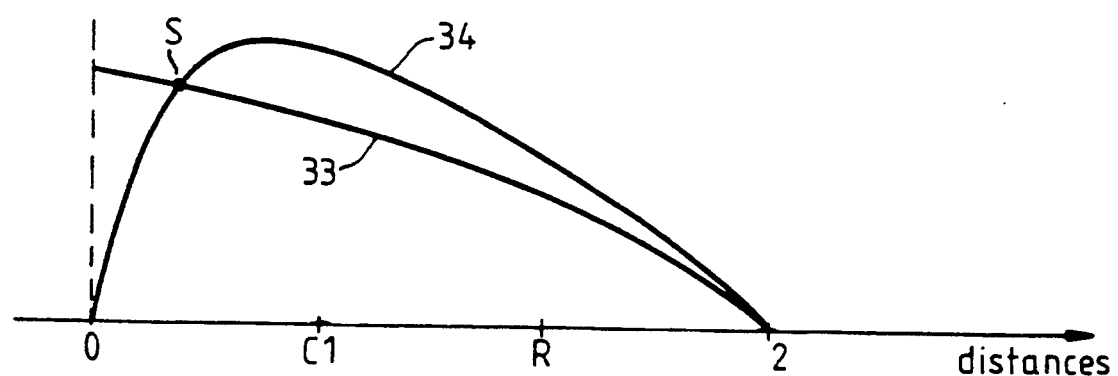
FIG. 5 shows the intersection of two energy level curves related to the first distance compartment.

An additional valuable feature of the invention lies in the fact that, since the responses of the previous demodulations are continuous curves 32, 33, it is possible, by modifying the relative gain of one of the demodulation channels, to bring about an intersection of the two curves as can be seen in FIG. 5, where the curve 32 obtained by subtractive aliasing has been amplified to give the curve 34. This curve 34 has a point of intersection S with the curve 33. On the basis of this result, it is possible to obtain a variant of the method according to the invention. Indeed, an all-or-nothing comparison of the two energy levels, at least one of which is amplified by a predetermined value, makes it possible to know if the distance is greater or smaller than a given distance that is actually the distance corresponding to the point of intersection S of the two curves. This given distance could be small or even zero. A possible embodiment of a device for the implementation of the method according to the invention is shown in FIG. 6.

Figure 6:
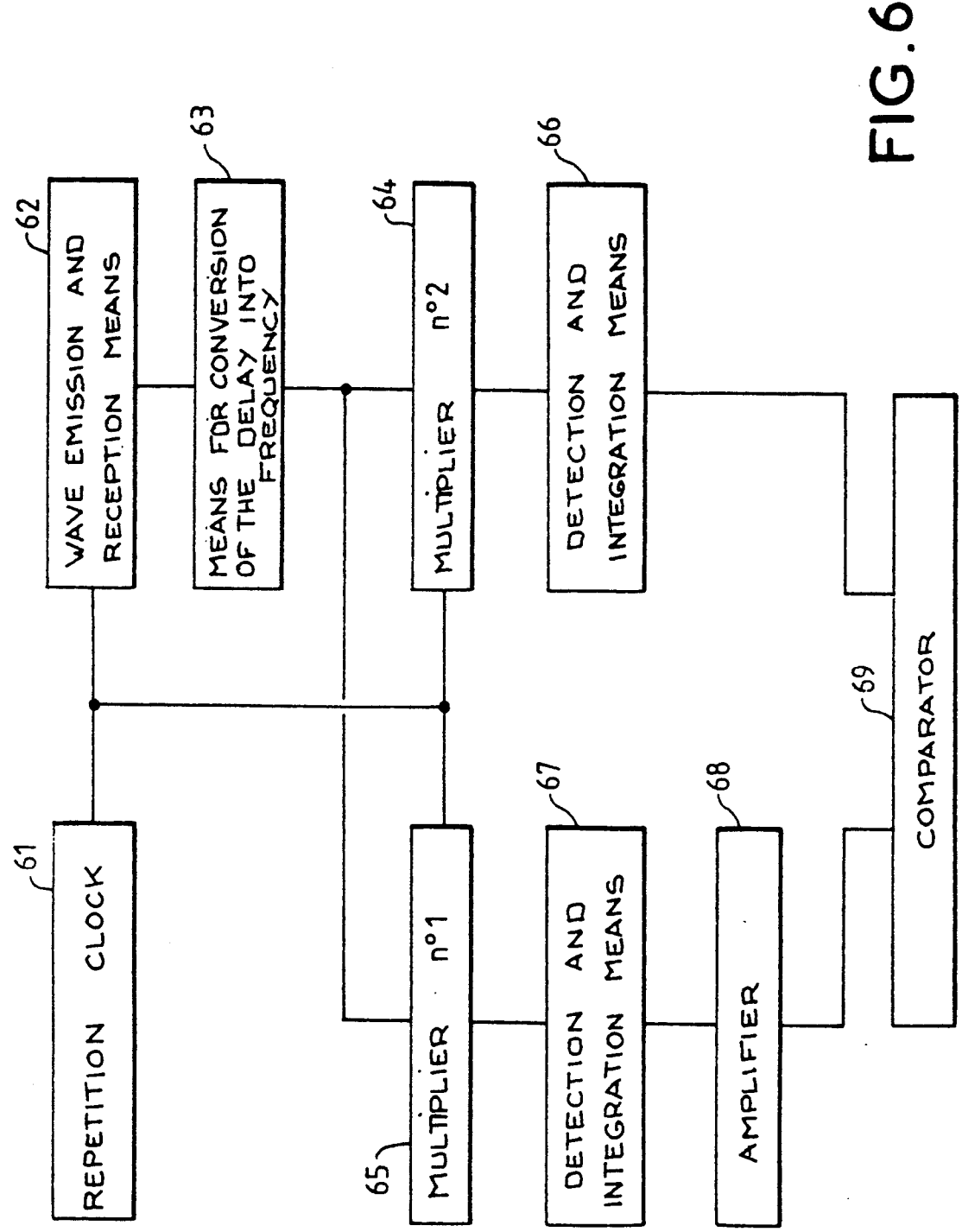
FIG. 6 shows a possible embodiment of a device for the implementation of the method according to the invention.

The device described by the block diagram of FIG. 6 comprises a repetition clock 61 working at the frequency 1/T, coupled to means 62 for the transmission and reception of the wave, to a multiplier No. 1 referenced 65 and a multiplier No. 2 referenced 64. The multiplier No. 1 referenced 65 may, for example, deliver the signal 41 of FIG. 4a and the multiplier No. 2 referenced 64 may deliver the signal 42 of FIG. 4b. These multipliers may be made in a simple way with logic parts for example. The means 62 are coupled to means 63 for the conversion of the delay into frequency. The output function of these means, for example the function 3 of the curve 1c, is demodulated by the signals from the multipliers 64 and 65. Detection and integration means 66, 67, connected to the outputs of the multipliers 64, 65, make it possible to obtain the energy levels related to the distance compartments and especially to the first distance compartment. For example, the means 64 deliver the level 33 of FIG. 3c, and the means 65 deliver the level 32 of FIG. 3c. An amplifier 68 is coupled to the output of the detection and integration means 67. This amplifier 68 amplifies for example the level 32 in order to obtain, at its output, the level 34 of FIG. 5 for example. The outputs of the amplifier 68 and of the detection and integration means 66 are connected to the input of a comparator 69. This enables the comparison, for example, of the energy levels 32 and 34 and, according to an output signal, it is thus possible to determine whether the distance is greater than a reference distance. The gain of the amplifier 68 can be adjusted as a function of the desired reference distance, prompting the switching over of the comparator 69.

The method according to the invention can be applied irrespectively of the type of wave emitted by the measuring means. These means may be electromagnetic, optical, acoustical or of any other type.

What is claimed is:

1. A method for the measurement of short distances by analysis of the delay of propagation of an electromagnetic wave, the distance to a target being segmented into adjacent distance compartments, the first of which starts at the position of a measuring means, at zero distance, said method comprising the steps of sending an emitted signal in the form of a frequency modulated electromagnetic wave towards a target using said measuring means, obtaining an energy level associated with each distance compartment by demodulating the delay measurement signal resulting from the product of correlation between said emitted signal sent to said target and a signal received by said measuring means, said received signal being the reflection of said signal sent to said target, and creating two distinct aliasings of the spectrum of said delay measurement signal resulting from the product of correlation between said emitted signal and said received signal, the energy level of which corresponds to said first distance compartment, said two distinct aliasings being aliasings on the part of said spectrum corresponding to negative distances, the alias corresponding to the zero distance, said two distinct aliasings providing for obtaining two distinct energy levels on the totality of said first distance compartment and enabling the measurement of all the distances on said first distance compartment by comparisons and analyses of said two energy levels.

2. A method according to claim 1, wherein said method achieves a subtractive aliasing of the spectrum by a demodulation of the delay measurement signal by multiplying said delay measurement signal with a periodic function of a frequency equal to the frequency of modulation of said emitted signal, such that said periodic function has a phase of 90° or 270° in the middle of the demodulation period.

3. A method according to claim 1, wherein said method achieves an additive aliasing of the spectrum by a demodulation of the delay measurement signal by multiplying said delay measurement signal with a periodic function of a frequency equal to the frequency of modulation of said emitted signal, such that said periodic function has a phase of 0° or 180° in the middle of the demodulation period.

4. A method according to claim 1, wherein said method achieves an amplification of said energy levels of said first distance compartment so that said two energy levels intersect so as to enable measurement, by a comparison of said two resulting energy levels, of said distance to said target with respect to the distance corresponding to the point of intersection of said two energy levels.

5. A device for measuring short distances to a target by analysis of the delay propagation of an electromagnetic wave, the distance between the device and target being segmented into adjacent distance compartments, a first one of which starts at the position of the device, at zero distance, said device comprising:

a repetition clock, wave sending and receiving means coupled to said repetition clock for sending an emitted signal in the form of a frequency modulated electromagnetic wave towards said target and for receiving a signal which is a reflection of said emitted signal sent to said target, means, coupled to said wave sending and receiving means, for converting a delay measurement signal resulting from the product of correlation between said emitted signal sent to said target and said signal received from said target into frequency, first and second multiplier means, coupled to said repetition clock and said means for converting, for demodulating said delay measurement signal and for creating two distinct aliasings of the spectrum of said delay measurement signal, the energy level of which corresponds to said first distance compartment, said two distinct aliasings being aliasings on the part of said spectrum corresponding to negative distances, the alias corresponding to the zero distance, first and second detection and integration means, coupled to said first and second multiplying means, for obtaining energy levels related to each distance compartment including all distances on said first distance compartment, an amplifier coupled to said first detection and integration means for amplifying said energy level outputted from said first detection and integration means, and a comparator, coupled to said amplifier and said second detection and integration means for comparing said energy levels outputted by said amplifier and said second detection and integration means.

6. A device according to claim 5, wherein the gain of the amplifier is adjustable.

* * * * *